3,252,931
THERMOSETTING TERPOLYMER

Helmuth L. Pfluger, Huntingdon Valley, and Charles G. Gebelein, Philadelphia, Pa., assignors to The Borden Company, New York, N.Y., a corporation of New Jersey
No Drawing. Filed Aug. 30, 1962, Ser. No. 220,561
1 Claim. (Cl. 260—27)

This invention relates to a thermosetting terpolymer and the process of using and making it.

The invention is particularly useful as an adhesive and will be illustrated in connection therewith.

Adhesives based on vinyl acetate or other vinyl esters are particularly economical and are in extensive use. They are thermoplastic, however, and are not satisfactory in resistance to elevated temperatures or to moisture.

The present invention converts the economical vinyl acetate or other vinyl ester to a thermosetting cross-linkable type of resin with a minimum increase of cost. Also, it provides an adhesive with a major proportion of the economical vinyl ester that will withstand the usual severe water boiling test.

Briefly stated, the invention comprises the terpolymer of a vinyl ester with minor proportions of glycidyl acrylate or the like and a conversion agent of which the amide of an alpha-unsaturated acid is an example. The invention comprises also the herein described process of making and using such terpolymer.

The said ester with which we start is ordinarily vinyl of allyl acetate, propionate, butyrate and/or a homolog thereof. Vinyl acetate is particularly effective and is the ester ordinarily selected for the conversion.

The glycidyl ester is that of an acrylic acid, i.e., an acrylate or methacrylate, although we may use the glycidyl itaconate, citraconate and mesaconate.

The copolymerizable conversion agent, which causes crosslinking by providing a proton, to open the oxirane ring of the glycidyl ester, is a compound of the formula RCO—X. R is an alpha-unsaturated hydrocarbon residue, examples of which are $CH_2=CH-$ and $CH_2=C(CH_3)-$. X is a monovalent component, namely a hydroxy, hydroxyalkyl, $-C_nH_{2n}OH$ in which $n$ is an integer within the range 1–6, or an amide group —NHR' in which R is hydrogen or a $C_1-C_4$ alkyl.

Examples of such conversion agents are acrylic acid, its amides, and substituted amides of the formulas:

$CH_2=CH-COOH$ acid
$CH_2=CH-CO-NH_2$ amide
$CH_2=CH-CO-NH(CH_3)$ methamide

As to proportions we use approximately 2–10 and ordinarily 2–5 parts of the glycidyl ester and about 0.5–5 parts of the crosslinking agent for 75–95 parts of the vinyl ester. The terpolymer produced contains 80%–95% of vinyl acetate residues. It shows the desired economy and thermosetting and water boil resistance properties.

The surfactant or emulsifier is any one that is conventional in suspending polyvinyl esters in emulsion polymerization. Examples are Duponol WAQE, the sodium salt of lauryl alcohol sulfate; octylphenyl polyethoxy ethanol containing 30 to 100 ethoxy units per mole, e.g., Triton X–405; Triton 770, sodium salt of alkyl aryl polyether sulfate; Triton X–100, isooctylphenyl polyethoxy ethanol; Aerosol 22, tetrasodium N-1-(1,2-dicarboxyethyl)-N-octadecylsulfosuccinate; dioctyl sulfosuccinate sodium salt (Aerosol OT); Tergitol NPX, nonylphenyl polyethyleneglycol ether; Cyanamid Anionic DN; Alipal CO–436, ammonium salt of an alkyl (e.g., ethyl) phenoxy polyoxyethylene ethanol; and Tergitol 3A–9, polyoxyethylated tridecyl alcohol. Where the emulsifier contains a polyether, polyethoxy, or polyoxyethyl group, this component has suitably 10–100 ethoxy groups or like alkoxy group per mole.

Examples of suitable initiators are hydrogen peroxide; potassium, sodium and ammonium persulfates; redox systems such as combinations of peroxides or hydroperoxides with formaldehyde sulfoxylates or ascorbic acid. The initiators are conventional percompounds which produce free radicals and thus initiate the polymerization.

The proportions of the emulsifying agent and initiators are those that are customary as, for instance, 1 to 6 parts of the said agent and 0.1–0.5 part of initiator for 100 parts by weight on the mixed monomers on the dry basis.

The selected monomers are polymerized in an aqueous emulsion system. We introduce into the system any of the usual emulsifying agents and initiators for the polymerization or copolymerization of ethenoid materials.

The usual technique is to introduce the mixed monomers slowly and with vigorous agitation into the water medium containing some but not all of the emulsifying agent and initiator. The aqueous emulsion is maintained at a temperature to give the desired rate of copolymerization as at 40°–100° C., a usual range being about 65°–85° C. After the last monomer mixture has been introduced, the stirring at the selected temperature is continued until the drop in vapor pressure and the reaction are completed as shown by cessation of refluxing or of evolution of heat in the reaction mixture.

The resulting emulsion is satisfactory for use as an adhesive as in plying of wood surfaces to each other.

For such use, however, it is desirable to introduce an agent to promote spreading of the adhesive over the wood, e.g., polyvinyl alcohol or guar, arabic, or karaya gums, each in the proportion of about 0.5–5% of the weight of the adhesive emulsion, and polyethylene oxide known as Polyox WSR of numbers 35, 205 and 301 and having molecular weights of about 200,000, 500,000, and 3,500,000, respectively, in such amounts as 0.005%–0.25% of the emulsion.

Skeletonized reactions showing the interaction of the amide and glycidyl groups in the cross-linking step, follows:

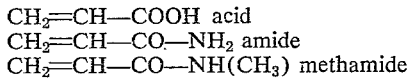

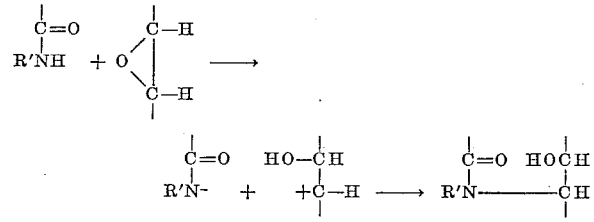

The positive and negative radicals, shown in the intermediate step, may also associate with the surface particles of the wood, to improve the adherence to the substrate.

Whether or not this is the best mechanical representation of the changes which occur, it is a fact that blocks of wood glued with the thermosetting polymer withstand more than twice as many cycles of 15 minutes' soaking in boiling water, followed by 40 minutes' drying in air at 105° C. after each soaking, than do like specimens glued with the same vinyl acetate and glycidyl ester combination but without the amide or other conversion agent, to give the terpolymer.

The invention will be further illustrated by description in connection with the following specific examples, proportions here and elsewhere herein being expressed as parts by weight.

Example 1

Vinyl acetate in the amount of 93 parts by weight was copolymerized in an aqueous emulsion, at a temperature within the range 40°–100° C. and in a pressure vessel under nitrogen, with 5 parts of glycidyl methacrylate and 2 parts of methacrylamide. Triton X–405 was used as the emulsifying agent and potassium persulfate as the initiator in the amounts of 5 parts and 0.2 part, respectively.

Then 100 parts by weight of the emulsion, of solids content 52.4%, was mixed with a thickening agent, to promote spreading over wood veneer or the like with 29.5 parts of 9.5% aqueous solution of polyvinyl alcohol of relatively high viscosity resulting from the hydrolysis of polyvinyl acetate to the extent of 98% complete. The adhesive so made was applied to wood veneers which were then consolidated by compression and heated while under such pressure at 150° C. for 30 minutes. The product so made withstood more than 10 of the hot water heating periods followed by heating in air as described above.

The control test, in which the conversion agent (the amide) was omitted, failed in 5 such boiling and subsequent air treatments.

Example 2

The composition and process of Example 1 were used exactly as there described except that the Triton X–405 was substituted by 3 parts of sodium lauryl sulfate.

Example 3

An adhesive emulsion was made by the emulsion polymerization of 93 parts of vinyl acetate with 5 parts of glycidyl acrylate and 2 parts of the methamide of methacrylic acid, $CH_2=C(CH_3)CO-NH(CH_3)$. The emulsifying agent was sodium dioctylsulfosuccinate and the initiating agent a 30% solution of hydrogen peroxide in the proportions of 3 parts and 0.3 part, respectively.

To control the character of the emulsion and the vigorousness of the exotherm, the emulsifying agent and the initiator were added in portions. The emulsion polymerization was completed at a temperature of about 65° C. and under an atmosphere of nitrogen. Then there was admixed the spreading promoter or thickening agent in the form of Polyox WSR–35 in the amount of 0.07% of the emulsion and tests made satisfactorily as in Example 1.

Example 4

The procedure and composition of Example 1 are used except that the vinyl acetate there disclosed is replaced, separately and in turn by vinyl propionate, butyrate and stearate, the whole formula being 93 parts of the selected vinyl ester, 5 parts of the glycidyl methacrylate, 2 of methacrylamide, and the emulsifying agent, initiator, and spreading promoter in amounts and of kinds described in Example 1.

The copolymerization is effected as described in Example 1 and the product used in making Douglas fir plywood.

Example 5

The procedure and composition of Example 1 are used except that the glycidyl methacrylate is replaced, separately and in turn, by 5 parts of glycidyl acrylate, itaconate, citraconate and mesaconate. The composition with the emulsifier and initiator is then processed as described in Example 1, mixed with 2% of its weight of guar gum, and the resulting emulsion used on veneer for plywood in the hot press curing operation of the plywood industry.

It will be understood that it is intended to cover all changes and modifications of the examples of the invention herein chosen for the purpose of illustration which do not constitute departures from the spirit and scope of the invention.

We claim:

A plywood adhesive comprising a thermosetting resin comprising:

(1) the terpolymer of:
    (a) about 90–95 parts by weight of a vinyl ester of a $C_1$–$C_{18}$ aliphatic acid;
    (b) 2–10 parts of a glycidyl ester of a $C_3$–$C_8$ alpha-unsaturated aliphatic acid;
    (c) 0.5–5 parts of a conversion agent of the formula R—CO—X in which R is an unsaturated hydrocarbon residue having an ethenoid bond in the position alpha with respect to the CO group and X is a monovalent component selected from a class consisting of the hydroxy group, hydroxyalkyls having 1–6 carbon atoms, and an amide radical of the formula —NHR' in which R' is selected from a group consisting of hydrogen and $C_1$–$C_4$ alkyls; and (2) a spreading promoter selected from the group consisting of:
    (a) polyvinyl alcohol, (b) guar, (c) arabic, (d) karaya gums, and (e) polyethylene oxide of molecular weight between about 200,000–3,500,000.

References Cited by the Examiner

UNITED STATES PATENTS

| | | | |
|---|---|---|---|
| 2,580,901 | 1/1952 | Erickson et al. | 260—80.5 |
| 2,904,523 | 9/1959 | Hawkins et al. | 260—29.6 |
| 3,052,659 | 9/1962 | Woodruff | 260—80.5 |

MURRAY TILLMAN, *Primary Examiner.*

LEON J. BERCOVITZ, *Examiner.*